# 2,897,075
INHIBITOR FOR BUFFING COMPOUND

Paul Gibson, Chicago, Ill., and Bonnie J. Bogdanoff, Syracuse, N.Y., assignors to Swift & Company, Chicago, Ill., a corporation of Illinois No Drawing. Application July 5, 1957
Serial No. 669,936

14 Claims. (Cl. 51—304)

The present invention relates to buffing compositions and to methods of manufacturing buffing compositions.

One abrasive compound commonly employed in polishing stainless steel, silver, and other metals consists of a mixture of calcium oxide (lime) and magnesium oxide. These powdery materials are usually suspended in a fatty acid binder in order to provide a suitable means of transferring the abrasive to polishing wheels. In practice, after the abrasive is thoroughly mixed with a melted fat such as stearic acid or stearic acid and tallow, the composition is either molded or extruded into bars or discs. When the bar or disc is later held against a revolving buffing wheel friction remelts the fat causing the abrasive to be deposited evenly on the surface of the wheel.

Although fatty acids make a convenient medium for carrying lime-based abrasives, an undesirable reaction often takes place between the lime and the fatty acid which hinders the transfer of the abrasive to the buffing wheel. Within a few hours or days after the bar or disc is molded or cast, for example, its surface often begins to crack and flake off due to the formation of a hard, irregular film of calcium stearate. In such cases, the buffing composition does not melt properly when placed in contact with the wheel and, therefore, the abrasive is not transferred evenly to the polishing surface. Undesirable calcium stearate deposits may also be left on a wheel after it has been treated with buffing compositions which have undergone a fatty acid-lime reaction.

Another difficulty faced in preparing polishing compositions of this type lies in their occasional tendency to form a cement-like material immediately on adding the lime to the fatty acid in a mixing kettle. When this occurs it is necessary to chip the material (mainly calcium stearate) out of the kettle with an air hammer or some other suitable device before the equipment can again be used.

It is, therefore an object of the present invention to provide a method of manufacturing lime-fatty acid buffing compositions which will not solidify in the mixing kettle.

Another object of the present invention is to provide a method of manufacturing lime-fatty acid buffing compositions which method substantially eliminates the formation of lime-fatty acid reaction products.

It is still another object of the present invention to provide an improved lime-fatty acid buffing composition which retains its fluidity during mixing and its smooth surface for extended periods of time thereafter.

Additional objects not specifically set forth herein will become readily apparent to one skilled in the art from the following detailed description of the invention.

The present invention, in general, is based on the discovery that certain antioxidants when added to a fat binder either prior to or shortly after a lime based abrasive has been dispersed in the binder, will prevent undesirable reactions between the fat and the buffing ingredients. More particularly, it has been found that the addition of a fat antioxidant such as di-tertiary-butyl-para-cresol, beta naphthol, propyl gallate, diphenylamine, butylated hydroxy anisole, etc., to fatty acids such as stearic acid, palmitic acid, etc., will prevent the fat from reacting with calcium oxide, thereby forming harmful amounts of calcium stearate.

The concentration of the antioxidant based on the weight of the fatty binder should be from about 0.01% to about 1.0%. The upper limit of the range has been selected for economic reasons in that amounts in excess of 1% will not prevent the antioxidant from performing its designated function.

In practice the antioxidant may conveniently be added to the molten fatty material immediately after the fat has been decolorized and before mixing the fat with the buffing ingredients.

The following examples illustrate the present invention:

Example I

A 0.1% quantity of di-butyl-para-cresol was added to a commercial stearic acid sample (40–45% stearic acid, 50–55% palmitic acid and 0–5% oleic acid). This sample, and a like sample of commercial stearic acid without the antioxidant were held at 200° F. for two days. At the end of that period, Vienna Lime (a calcium oxide-magnesium oxide mixture) was added to each sample in a 70–30 weight ratio. After a holding period of 6 hours at 200° F. the mixture containing di-butyl-para-cresol was still fluid whereas the control sample of stearic acid immediately reacted with the lime on mixing and solidified.

Example II

A mixture of 7 parts Vienna Lime, 3 parts stearic acid, and 0.1% di-butyl-para-cresol based on the weight of the fat was held at 200° F. for 24 hours. A second mixture of the two ingredients without the antioxidant was held at the same temperature. The mixture containing the antioxidant was still fluid after 24 hours, whereas the control sample solidified within 6 hours due to the formation of calcium and/or magnesium stearate.

Example III

Four mixtures of Vienna Lime and commercial stearic acid were held at 200° F. for several days. The stearic acid abrasive carrier consisted of—
(1) Control,
(2) Control plus 0.1%[1] diphenylamine,
(3) Control plus 0.1%[1] beta naphthol,
(4) Control plus 0.1%[1] Sustane 3 (a trademark for an antioxidant consisting of:
    20% butylated hydroxyanisole
    4% citric acid
    6% propyl gallate
    70% propylene glycol)

[1] Based on the weight of the fat.

After two days at 200° F. the control stearic-acid Vienna Lime mixture had solidified, whereas the other samples were still fluid after three days under the same conditions.

Example IV

A mixture of 7 parts Vienna Lime and 3 parts stearic acid was held at 200° F. for 16 hours at which time the mixture solidified. A similar sample containing 0.02% di-tertiary-butyl-para-cresol held under like conditions was still fluid after 40 hours.

Example V

Several disk-shaped bars were molded from a mixture of 7 parts Vienna Lime and 3 parts stearic acid which fatty acid contained 0.1% di-tertiary-butyl-para-cresol.

At the end of a 6 week storage period, the bars had a smooth surface which approximated their original appearance. In contrast, a hard film formed on the surface of control bars molded from an identical mixture without the antioxidant during the 6 week storage period. The control samples were rough and cracked and were not suitable for use in transferring the abrasive to a polishing wheel.

The usual abrasive carrier consists of a mixture of tallow and stearic acid and/or palmitic acid. The fat proportions are varied according to the hardness and melting point desired for the buffing bar.

If lime and a fatty acid are brought together in the presence of moisture, the lime changes from an oxide to a hydroxide which in turn reacts with the acid to form a lime soap. For this reason caution must be taken to keep the moisture content of the compound as low as possible even where an antioxidant of the present invention is added to the fat.

The inhibitor is effective in a range of about 0.01% up to and beyond 1.0%. Although the use of amounts greater than 1.0% would not decrease the efficiency of the inhibitor, such high concentrations are not feasible from an economic standpoint. The preferred inhibitor level has been found to be about 0.1% based on the weight of the fatty material.

The inhibitor increases the length of time during which the buffing compound can be held regardless of the holding temperature. Where higher temperatures are used, however, the inhibitor is especially effective in slowing down or preventing the undesirable lime-fatty acid reaction.

Obviously many modifications and variations of the invention as hereinbefore set forth may be made without departing from the spirit and scope thereof, and therefore only such limitations should be imposed as are indicated in the appended claims.

We claim:

1. A method of preparing lime based buffing compounds which comprises: adding at least about 0.01% of a fat antioxidant to a binding material containing a fatty acid selected from the group consisting of stearic acid, palmitic acid, and mixtures thereof, and thereafter adding to said binding material a lime based buffing compound.

2. A method as in claim 1 wherein the fat antioxidant is di-tertiary-butyl-para-cresol.

3. A method as in claim 1 wherein the fat antioxidant is diphenylamine.

4. A method as in claim 1 wherein the fat antioxidant is butylated hydroxy anisol.

5. A method as in claim 1 wherein the fat antioxidant is propyl gallate.

6. A new lime based buffing compound which comprises: a binding material containing a fatty acid selected from the group consisting of stearic acid, palmitic acid, and mixtures thereof, a lime based buffing compound, and at least about 0.01% of a fat antioxidant.

7. A compound as in claim 6 wherein the fat antioxidant is di-tertiary-butyl-para-cresol.

8. A compound as in claim 6 wherein the fat antioxidant is diphenylamine.

9. A compound as in claim 6 wherein the fat antioxidant is butylated hydroxy anisole.

10. A compound as in claim 6 wherein the fat antioxidant is propyl gallate.

11. A method of preparing lime based buffing compounds which comprises: adding at least about 0.01% of a fat antioxidant selected from the group consisting of ditertiary-butyl-para-cresol, diphenylamine, beta naphthol, butylated hydroxy anisole, and propyl gallate to a binding material containing a fatty acid selected from the group consisting of stearic acid, palmitic acid, and mixtures thereof, and thereafter adding to said binding material a lime based buffing compound.

12. A new lime based buffing compound which comprises: a binding material containing a fatty acid selected from the group consisting of stearic acid, palmitic acid, and mixtures thereof, a lime based buffing compound, and at least about 0.01% of a fat antioxidant selected from the group consisting of di-tertiary-butyl-para-cresol, diphenylamine, beta naphthol, butylated hydroxy anisole, and propyl gallate.

13. A method of preparing lime based buffing compounds which comprises: adding from about 0.01% to about 1.0% of a fat antioxidant selected from the group consisting of di-tertiary-butyl-para-cresol, diphenylamine, beta naphthol, butylated hydroxy anisole, and propyl gallate to a binding material containing a fatty acid selected from the group consisting of stearic acid, palmitic acid, and mixtures thereof, and thereafter adding to said binding material a lime based buffing compound.

14. A new lime based buffing compound which comprises: a binding material containing a fatty acid selected from the group consisting of stearic acid, palmitic acid, and mixtures thereof, a lime based buffing compound, and from about 0.01% to about 1.0% of a fat antioxidant selected from the group consisting of a di-tertiary-butyl-para-cresol, diphenylamine, beta naphthol, butylated hydroxy anisole, and propyl gallate.

References Cited in the file of this patent

UNITED STATES PATENTS

| | | |
|---|---|---|
| 2,453,710 | Hughes et al. | Nov. 16, 1948 |
| 2,606,829 | Chester et al. | Aug. 12, 1952 |